US011752991B2

(12) United States Patent
Eisele et al.

(10) Patent No.: US 11,752,991 B2
(45) Date of Patent: Sep. 12, 2023

(54) METHOD FOR OPERATING A BRAKE SYSTEM, AND BRAKE SYSTEM

(71) Applicant: Robert Bosch GmbH, Stuttgart (DE)

(72) Inventors: Achim Eisele, Hessigheim (DE); Andreas Klug, Untergruppenbach (DE); Andreas Zoebele, Markgroeningen (DE); Jan Becker, Backnang (DE); Matthias Kranich, Grossbottwar (DE); Philipp Weingart, Heilbronn (DE); Ruediger Poggenburg, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 198 days.

(21) Appl. No.: 17/259,878

(22) PCT Filed: Jun. 22, 2019

(86) PCT No.: PCT/EP2019/066564
§ 371 (c)(1),
(2) Date: Jan. 12, 2021

(87) PCT Pub. No.: WO2020/035200
PCT Pub. Date: Feb. 20, 2020

(65) Prior Publication Data
US 2021/0276518 A1  Sep. 9, 2021

(30) Foreign Application Priority Data
Aug. 13, 2018 (DE) .......................... 102018213592.4

(51) Int. Cl.
*B60T 8/1761* (2006.01)
*B60T 8/172* (2006.01)
*B60T 8/32* (2006.01)

(52) U.S. Cl.
CPC .......... *B60T 8/17616* (2013.01); *B60T 8/172* (2013.01); *B60T 8/321* (2013.01); *B60T 2201/12* (2013.01);
(Continued)

(58) Field of Classification Search
CPC ...... B60T 8/17616; B60T 8/172; B60T 8/321; B60T 2201/12; B60T 2230/04; B60T 2240/00; B60T 2250/00; B60T 2270/10
See application file for complete search history.

(56) References Cited

U.S. PATENT DOCUMENTS 5,011,236 A     4/1991  Toepfer et al.
5,772,289 A  *  6/1998  Nakazawa ................ B60T 8/00
                                                  303/9.69
(Continued)

FOREIGN PATENT DOCUMENTS

CN      102358275 A     2/2012
CN      103857570 A     6/2014
(Continued)

OTHER PUBLICATIONS

International Search Report for PCT/EP2019/066564, dated Oct. 7, 2019.

*Primary Examiner* — Kenneth J Malkowski
*Assistant Examiner* — Andrew J Cromer
(74) *Attorney, Agent, or Firm* — NORTON ROSE FULBRIGHT US LLP; Gerard Messina

(57) ABSTRACT

A method for operating a brake system of a vehicle. A precontrol value for a brake pressure of the brake system is set by using an admission pressure value representing a admission pressure in the brake system and a processing specification representing a braking dynamics of the vehicle.

12 Claims, 3 Drawing Sheets

(52) U.S. Cl.
CPC ....... *B60T 2230/04* (2013.01); *B60T 2240/00* (2013.01); *B60T 2250/00* (2013.01); *B60T 2270/10* (2013.01)

(56) References Cited

U.S. PATENT DOCUMENTS 6,668,634 B1 * 12/2003 Zimmermann ....... B60T 8/4059
303/3
2009/0134698 A1 5/2009 Herges

FOREIGN PATENT DOCUMENTS

| | | |
|---|---|---|
| CN | 205149832 U | 4/2016 |
| CN | 106043263 A | 10/2016 |
| EP | 2581259 A1 | 4/2013 |
| JP | H0971231 A | 3/1997 |

* cited by examiner

METHOD FOR OPERATING A BRAKE SYSTEM, AND BRAKE SYSTEM

FIELD

The present invention relates to a method for operating a brake system and to a brake system.

BACKGROUND INFORMATION

A vehicle may have an anti-lock system. The anti-lock system is able to prevent an enduring locking of the wheels of the vehicle by interventions into a brake system of the vehicle. This allows the vehicle to remain steerable while braking.

SUMMARY

Against this background, the present invention provides a method for operating a brake system and a brake system, as well as a corresponding computer program product and a machine-readable storage medium. Advantageous developments and improvements of the present invention here derive from the description herein and the figures.

Specific embodiments of the present invention advantageously make it possible, when applying the brakes on a vehicle quickly, to shorten the period of time until an ABS of the vehicle has adjusted a brake slip of the vehicle to an optimal slip range.

In accordance with an example embodiment of the present invention, a method is provided for operating a brake system of a vehicle, which is characterized in that a precontrol value for a brake pressure of the brake system is set by using an admission pressure value representing admission pressure in the brake system and a processing specification representing a braking dynamics of the vehicle.

Specific embodiments of the present invention may be regarded, inter alia, as being based on the thoughts and findings described below.

A braking force on a wheel of a vehicle may be greater than a static friction of the wheel on its subsurface. A slip of the wheel on the subsurface then becomes greater than a tolerable slip. For the vehicle to remain steerable, an anti-lock function of a brake system of the vehicle intervenes and reduces a brake pressure in a wheel brake cylinder of the wheel until the braking force is again smaller than the static friction. As a result, the slip is also smaller than the tolerable slip, and the vehicle may be steered again. Subsequently, the brake pressure is increased again until the slip is again greater than the tolerable slip. This starts a new intervention cycle of the anti-lock function. These cycles are performed repeatedly. The vehicle is thereby braked at the maximum deceleration possible on the subsurface.

The static friction is influenced by a normal force on the wheel. The normal force depends on a weight distribution of the vehicle and a brake dynamics of the vehicle. Since a center of gravity of the vehicle is at a distance from the ground, due to a mass inertia of the vehicle, the wheels on a front axle of the vehicle are under additional load when braking, while the wheels on a rear axle of the vehicle are under a lesser load. Moreover, due to its spring-mounted and damped wheel suspensions and the pneumatic tires, the vehicle is an oscillatory system, which is excited to oscillate by a pitching moment introduced when braking. During compression, the wheel suspensions and pneumatic tires are compressed, while during the rebound the load lessens on the wheel suspensions and pneumatic tires. While a wheel is compressed, the normal force is higher than when the wheel rebounds. For this reason, the wheel is able to transmit a higher braking force onto the subsurface during compression than during the rebound. This oscillation is superimposed on the weight distribution while braking.

A pressure sensor of the brake system measures an admission pressure between a master brake cylinder of the brake system and a valve block of the brake system. The admission pressure may thus be set by an operation of a brake pedal. Likewise, a driver assistance system of the vehicle is able to set the admission pressure, for example by otherwise operating the master brake cylinder or by controlling a separate transducer.

In accordance with an example embodiment of the present invention, the admission pressure acting on the wheel is adapted by the processing function to the static friction possible on the basis of the weight distribution and the dynamics of the vehicle in order to prevent the wheels from locking. The adapted admission pressure may be called the precontrol pressure.

A precontrol value may be set per axle of the vehicle. Due to the shift of weight when braking, less braking force may be transmitted at the rear axle than at the front axle. Additionally, the dynamics of the rear axle differ from the dynamics of the front axle.

The processing specification may represent a vehicle model-specific normal force curve over time during a braking operation of the vehicle. Different vehicle models have different braking dynamics. The processing specification may differ from vehicle model to vehicle model.

The processing specification may represent a vehicle model-specific pitch dynamics during a braking operation of the vehicle. Depending on the suspension setup, the vehicle may also have different pitch dynamics. The suspension setup may be represented in the processing specification.

A precontrol gradient of the precontrol value may be set by using an admission pressure gradient of the admission pressure value and the processing specification. When braking sharply, that is, when the brake pedal is depressed very quickly for example, the braking force increases very rapidly and may become markedly too high for the respective subsurface. The slip may then become very great and the wheel may lock. Conventionally, the anti-lock function reduces the braking pressure very drastically in its first intervention in order to prevent the wheel from locking or in order to get the wheel to turn again. Due to the inertia of the overall system, a certain time passes before the anti-lock function has been adjusted in a stable manner. During this time, the vehicle is not decelerated optimally. In the approach presented here, the processing function represents a relationship between the admission pressure and the precontrol pressure, in which the braking force rises in controlled fashion and the anti-lock function is able to intervene rapidly when a tolerable slip is reached.

The precontrol gradient may be limited if the admission pressure gradient is greater than a limit gradient. Up to a predetermined limit gradient, the anti-lock function is able to react sufficiently rapidly and no adaptation of the precontrol pressure is required. Beginning with the limit gradient, the precontrol gradient may be set to be lower by a factor than the admission pressure gradient. The precontrol gradient may also be limited to a maximum gradient. The precontrol gradient may be limited in stepwise fashion. The limited precontrol gradient may follow a predetermined gradient curve.

A setpoint value of the brake pressure may be controlled individually per wheel brake cylinder by using the precontrol value and a wheel speed of the wheel braked by the wheel brake cylinder. A wheel speed may be detected directly on the wheel. The wheel speeds of different wheels may differ. The wheel speed may be detected with a high dynamic performance. In contrast to the slip, which can only be estimated indirectly, the wheel speed may be measured directly. By using the derivative of the wheel speed it is possible to achieve control quickly. If the wheel speed falls too rapidly, the wheel will soon experience excessive slip.

The setpoint value may be set during initial brake application time in accordance with the precontrol value. Following the expiration of the initial brake application time, the setpoint value may be controlled using the precontrol value and the derivative of the wheel speed. At the beginning of the initial brake application process, a highly dynamic transient effect occurs due to properties of the suspension and of the tires, which is detected via the wheel speed. In order to suppress this for the control process, the wheel speed may be ignored until a predetermined initial brake application time. Following the initial brake application time, the control process may be started by using the wheel speed.

The change of the wheel rpm or the derivative may represent a wheel deceleration. It is possible to control the setpoint value in such a way that a wheel setpoint deceleration is additionally monitored by way of a wheel setpoint slip corridor. A wheel setpoint slip corridor may be defined by a minimum/maximum wheel setpoint slip threshold that is variable over time. If the wheel runs within the setpoint slip corridor, the setpoint wheel pressure gradient is calculated on the basis of the setpoint wheel deceleration. If minimum/maximum limits of the setpoint slip corridor are undershot/exceeded, the wheel pressure gradient is calculated on the basis of a setpoint slip-dependent strategy.

In accordance with example embodiments of the present invention, the method may be implemented for example in software or hardware or in a mixed form of software and hardware, for example in a control unit.

The present invention furthermore provides a brake system which is designed to carry out, control or implement the steps of a variant of the method presented here in corresponding devices.

In accordance with an example embodiment of the present invention, the brake system may comprise an electrical device having at least one processing unit for processing signals or data, at least one memory unit for storing signals or data, and at least one interface and/or a communication interface for reading in or outputting data, which are embedded in a communication protocol. The processing unit may be for example a signal processor, a so-called system ASIC or a microcontroller for processing sensor signals and for outputting data signals as a function of the sensor signals. The memory unit may be for example a flash memory, an EPROM or a magnetic memory unit. The interface may be designed as a sensor interface for reading in the sensor signals from a sensor and/or as an actuator interface for outputting the data signals and/or control signals to an actuator. The communications interface may be designed to read in or output the data in wireless and/or line-conducted fashion. The interfaces may also be software modules which, for example, exist on a microcontroller in addition to other software modules.

Also advantageous is a computer program product or computer program having program code that may be stored on a machine-readable carrier or memory medium such as a semiconductor memory, a hard-disk memory or an optical memory, and which is used to carry out, implement and/or control the steps of the method according to one of the specific embodiments described above, in particular when the program product or program is executed on a computer or a device.

It is pointed out that some of the possible features and advantages of the present invention are here described with reference to different specific embodiments. One skilled in the art will recognize, based on the disclosure herein, that the features of the brake system and of the method may be suitably combined, adapted or exchanged in order to arrive at further specific embodiments of the present invention.

BRIEF DESCRIPTION OF THE DRAWINGS

Specific embodiments of the present invention are described below with reference to the figures, while neither the figures nor the description are to be interpreted as limiting the present invention.

The figures are only schematic and not drawn true to scale. Identical reference numerals designate the same or similarly acting features.

DETAILED DESCRIPTION OF EXAMPLE EMBODIMENTS

Figure 1:
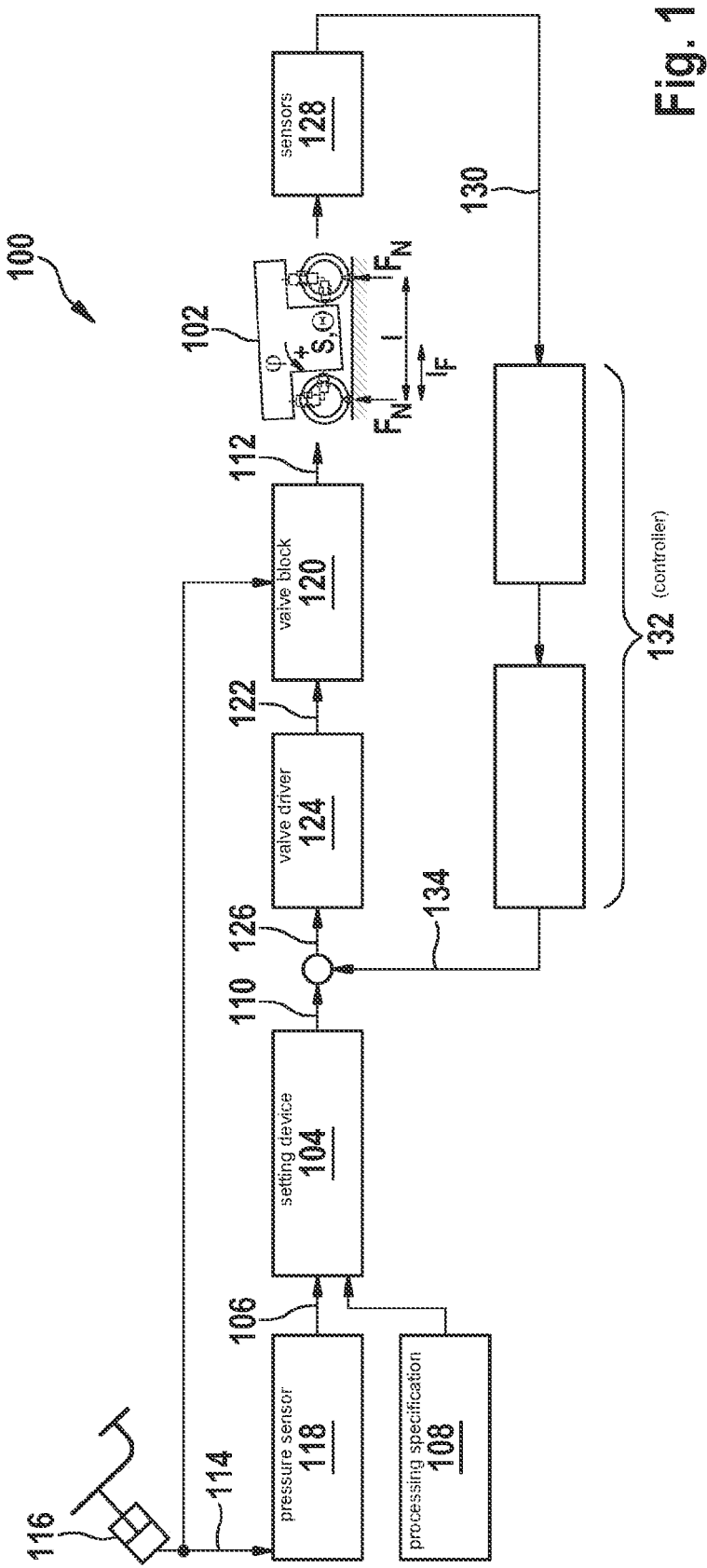
FIG. 1 shows a block diagram of a brake system according to one exemplary embodiment of the present invention.

FIG. 1 shows a block diagram of a brake system 100 of a vehicle 102 according to one exemplary embodiment. Brake system 100 is designed to carry out a method according to the approach presented here. For this purpose, brake system 100 has a setting device 104, in which a precontrol value 110 is set for a brake pressure 112 of brake system 100 by using an admission pressure value 106 and a processing specification 108. Admission pressure value 106 represents an admission pressure 114 in brake system 100, while processing specification 108 represents a braking dynamics of vehicle 102.

Admission pressure value 106 is detected by a pressure sensor 118 situated between a master brake cylinder 116 of vehicle 102 and brake system 100 and is provided as an electrical signal or data word for device 104.

Using the precontrol value 110, brake pressure 112 is set in a valve block 120 of brake system 100. For this purpose, valve block 120 is hydraulically connected to master brake cylinder 116. Valve block 120 has intake valves and discharge valves, via which the brake pressure 112 on the wheel brake cylinders of vehicle 102 may be set. The valves may be proportioning valves, on which a cross-section of passage may be set specifically. The intake valves are open in the currentless state. In the open state, brake pressure 112 is identical to admission pressure 114. If the cross-section of passage is narrowed on the intake valves, the brake pressure 112 falls compared to the admission pressure 114. The discharge valves are closed in the currentless state. The discharge valves are opened when the intake valves are closed. Through the discharge valves it is possible to reduce brake pressure 112 quickly and independently of admission pressure 114. The valves of valve block 120 are operated electrically via control signals 122. Control signals 122 are generated by a valve driver 124 using precontrol value 110. For example, the valves of valve block 120 are controlled by a pulse-width modulated control signal 122.

Brake pressure 112 is transmitted hydraulically to the wheel brake cylinders on wheels of vehicle 102. Each wheel brake cylinder actuates brake pads, which cause friction with the brake disk or brake drum coupled with the respective wheel. The friction generates a braking torque on the rotating wheel. Via a rolling radius of the wheel, the braking torque produces a braking force of the wheel.

A mass of vehicle 102 results in a force due to weight on the wheels. A weight distribution of vehicle 102 determines what share of the force due to weight acts on a wheel as the normal force. The normal force and a condition of the ground determine a frictional force, which may be transmitted from the wheel onto the subsurface. If the braking force is greater than a maximum static friction force, the wheel slides since a dynamic friction force on the same subsurface is normally lower than the static friction force. Before the wheel loses grip, slip arises. The slip results for example from a deformation of profile blocks of a tire of the wheel and/or a flexing of the tire into itself.

Due to the slip, the wheel rotates more slowly when braking that it would normally rotate at a speed of vehicle 102. When the wheel slides or locks, the wheel does not rotate even through vehicle 102 is moving.

When vehicle 102 is braked by the braking force, an inertial force directed counter to the braking force acts due to a mass inertia of vehicle 102. Expressed in simplified fashion, the inertial force acts on a center of gravity of vehicle 102. The center of gravity, however, is at a distance from a point of application of the braking force or the points of application of the braking forces, that is, the points of contact of the wheels with the subsurface. Due to this distance, a moment of rotation results on vehicle 102, which may be called a pitching moment. The pitching moment causes pitching forces on the wheels, which are superimposed on the forces due to weight on the wheels.

The wheels are spring mounted via wheel suspensions and the air-filled tires of the wheels act as pneumatic springs. The wheel suspensions are additionally damped by shock absorbers. Vehicle 102 is thus an oscillatory system and is excited to oscillate by the pitching moment. The pitching forces may be positive or negative. The wheels have additional load applied to them by positive pitching forces. Negative pitching forces reduce loads on the wheels. A positive pitching force increases the normal force on a wheel and the wheel suspension and the tire are compressed. A negative pitching force reduces the normal force on a wheel and the wheel suspension is decompressed, while the tire expands.

An oscillatory characteristic of this system is represented in processing specification 108. A time characteristic of the normal force is known from processing specification 108. Processing specification 108 may be ascertained for example by trials.

The time characteristic of the normal force likewise yields a time characteristic of the achievable braking force. More braking force can be achieved when a wheel compresses than when the wheel decompresses. Processing specification 108 increases the precontrol value 110 during compression and reduces it during decompression.

In one exemplary embodiment, a front precontrol value 110 is set for the front wheels or for a front axle of vehicle 102. A rear precontrol value 110 is set for the rear wheels or a rear axle of vehicle 102. This takes into account the often oppositely directed compression and decompression of the axles.

In one exemplary embodiment, setpoint values 126 for the brake pressures 112 of the individual wheels are controlled individually by using the respective precontrol value 110 and a derivative of a wheel speed of the respective wheel. For this purpose, the rotational speeds of the wheels are monitored by sensors 128 and represented in rotational speed values 130. Using the derivative of the rotational speed values 130, a controller 132 of brake system 100 controls for each wheel an individual setpoint value 126 for brake pressure 112. For this purpose, a correction factor 134 is determined, with which the respective precontrol value 110 is offset in order to obtain setpoint value 126.

If admission pressure 114 rises too quickly at the beginning of the braking process, an excessive braking torque is generated too quickly on the wheels, and the wheels lock. If the intake valves are closed only when the wheels lock, much brake pressure 112 must be released via the discharge valves until the brake pressure spike has dissipated and the wheels are turning again. Due to the inertia of the wheels and of the overall system, this process takes time. Only when the wheels again have static friction is it possible to increase brake pressure 112 again in order to arrive at a normal anti-lock control of brake system 100.

For this reason, in one exemplary embodiment, in addition to taking into account the oscillatory characteristic of vehicle 102, a precontrol gradient of precontrol value 110 is set as a function of an admission pressure gradient of admission pressure 114. If admission pressure 114 rises too quickly and exceeds a limit pressure, precontrol value 110 is set with a precontrol gradient that is reduced with respect to admission pressure 114. This at least narrows the cross-sections of passage of the intake valves in time and the brake pressure spike may be avoided. Due to the slower rise of brake pressure 112, the anti-lock control is able to intervene without a wheel locking beforehand, when the slip on the wheel is greater than a target slip. The precontrol gradient may be set for example as a function of time.

Figure 2:
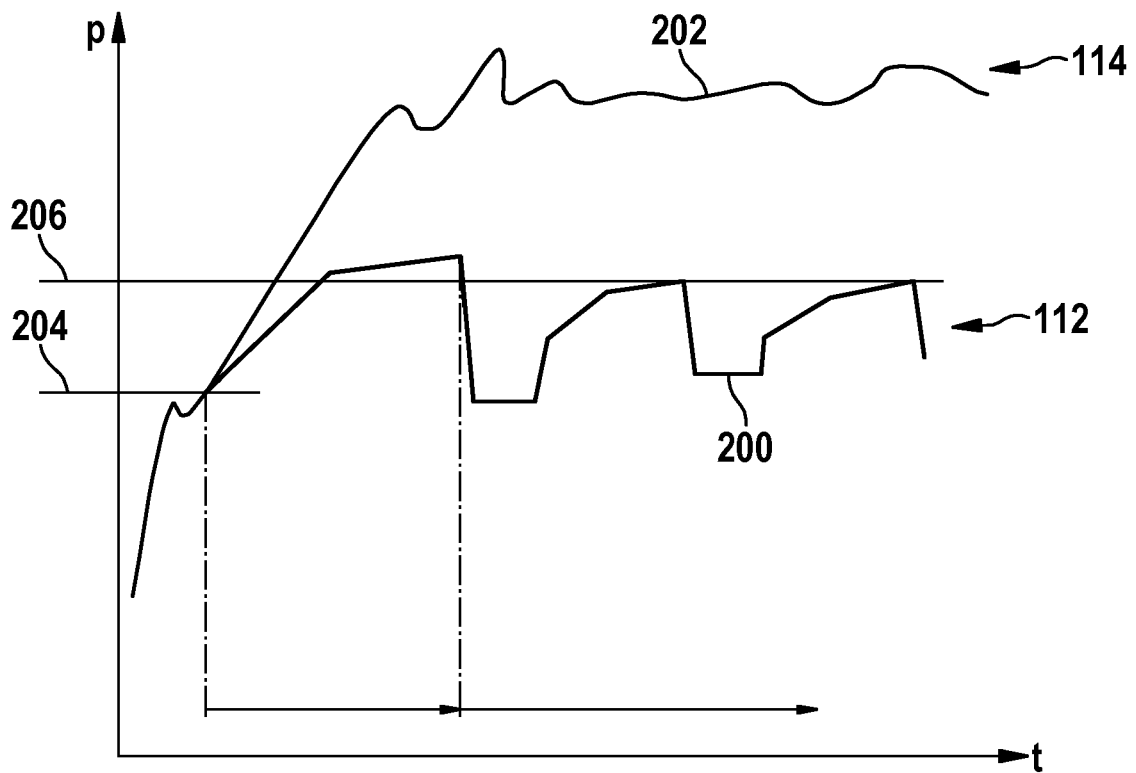
FIG. 2 shows a representation of a brake pressure curve that was controlled in accordance with one exemplary embodiment of the present invention.

FIG. 2 shows a representation of a brake pressure curve 200 that was controlled in accordance with one exemplary embodiment. Brake pressure curve 200 represents a time characteristic of at least one of the brake pressures 112 in FIG. 1 and may be detected for example on a wheel brake cylinder of a brake system, as is shown for example in FIG. 1. Brake pressure curve 200 is shown in a diagram, which represents time t on its abscissa and a pressure p on its ordinate. The diagram further shows an admission pressure curve 202. Admission pressure curve 202 represents a time characteristic of admission pressure 114 in FIG. 1. In the brake system represented in FIG. 1, admission pressure curve 202 is recorded by the pressure sensor at the input of the brake system.

Up to a limit pressure 204, brake pressure curve 200 and admission pressure curve 202 coincide with each other. If admission pressure 114 is greater than limit pressure 204, the precontrol value is set in order to influence brake pressure 112. As an additional criterion for setting the precontrol value, the admission pressure gradient or a rate is monitored at which admission pressure 114 rises. The precontrol value is set if the admission pressure gradient is greater than a limit gradient.

Here both criteria are fulfilled. Hence the precontrol value above the limit pressure 204 is set as a function of time such that the brake pressure 112 rises less quickly than admission pressure 114. Here, the function for the brake pressure curve 200 above limit pressure 204 describes two segments having different gradients. The first gradient is greater than the second gradient. The two segments approximate the shape of a curve.

Thus, above limit pressure 204, brake pressure 112 has a lower brake pressure gradient than admission pressure 114. Above limit pressure 204, brake pressure 112 reaches a value at which the slip at the wheel is greater than the target slip. Thereupon, the ABS of the vehicle intervenes and quickly lowers brake pressure 112 in order subsequently to approximate it to an ABS control pressure 206 and lower it again cyclically.

Figure 3:
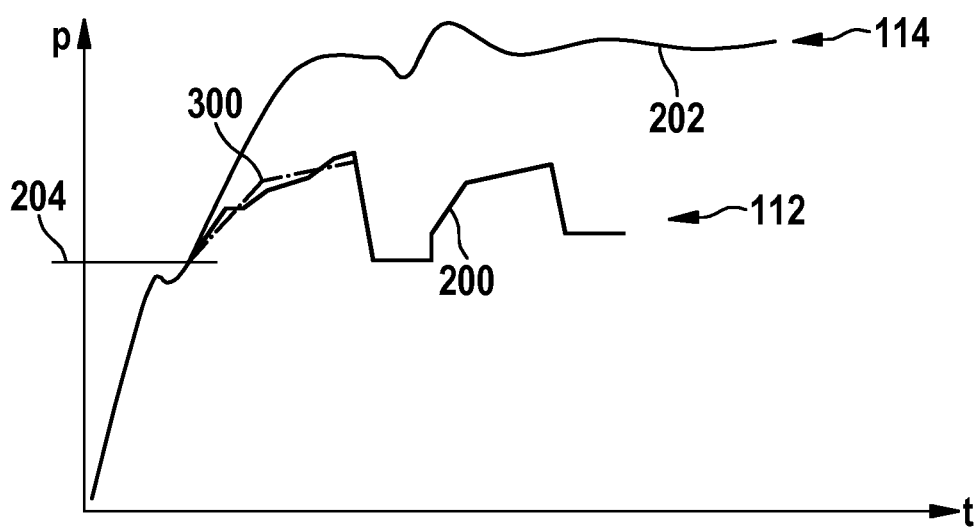
FIG. 3 shows a representation of a brake pressure curve controlled by using a wheel speed according to one exemplary embodiment of the present invention.

FIG. 3 shows a representation of a brake pressure curve 200 controlled by using a wheel speed according to one exemplary embodiment. The representation here essentially corresponds to the representation in FIG. 2. In addition, from the limit pressure 204 onward, the brake pressure 112 is controlled by using the derivative of the wheel speed so that the wheel speed decreases within a slip corridor. If the wheel speed is not lowered quickly enough, the setpoint value for the brake pressure is increased via a correction factor. If the rotational speed is lowered too quickly, the setpoint value is lowered via the correction factor. As a result of the control action, the actual brake pressure curve 200 fluctuates about a precontrol curve 300 specified via the precontrol value.

Figure 4:
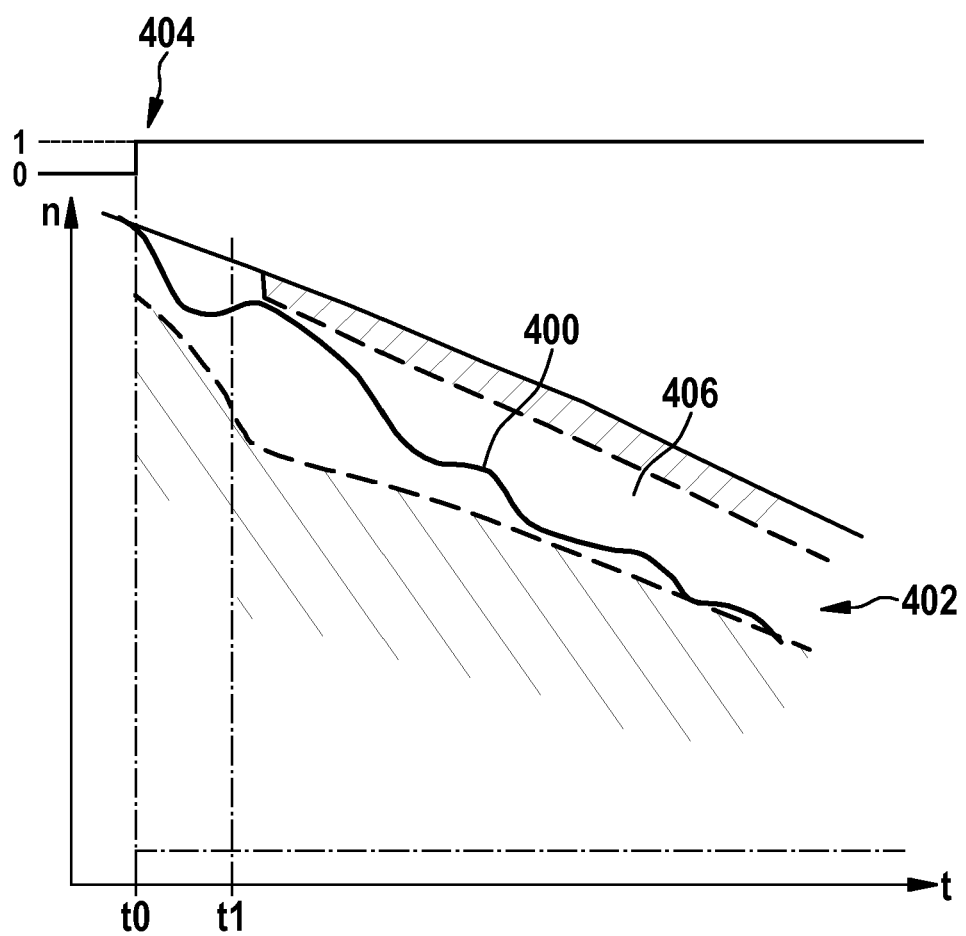
FIG. 4 shows a representation of a wheel speed curve that was controlled in accordance with one exemplary embodiment of the present invention.

FIG. 4 shows a representation of a wheel speed curve 400 that was controlled in accordance with an exemplary embodiment. Wheel speed curve 400 is plotted in a diagram, which represents time t on its abscissa and a wheel speed 402 on its ordinate. The wheel speed curve 400 thus represents a curve of a wheel speed 402 of a wheel over time t.

Wheel speed curve 400 here corresponds essentially to the brake pressure curve in FIG. 3. At a time t0, the precontrol of the brake pressure is activated in accordance with the approach presented here. The activation is represented here by a logical state change 404 from logical zero to logical one.

Up to a time t1, the brake pressure is set only in accordance with the precontrol value. At time t1, the control of the brake pressure is activated via the derivative of the wheel speed 402. The wheel speed 402 is detected via a rotational speed sensor on the wheel, and a correction factor for the precontrol value is calculated from the derivative of the wheel speed 402. Together, the correction factor and the precontrol value then yield a controlled setpoint value, via which the brake pressure is set in the valve block.

The wheel speed 402 is controlled within a slip corridor 406. Slip corridor 406 represents a tolerance range about a desired rotational speed curve. The desired rotational speed curve corresponds to an approximatively linear reduction of the wheel speed 402 over time t. The linear reduction corresponds to a constant deceleration.

If the current slip 402 is below the slip corridor 406, the correction factor is adapted in such a way that the brake pressure falls below the pressure specified by the precontrol value since the wheel exhibits too much slip.

As a result of the reduced brake pressure, the wheel speed 402 rises again into the slip corridor 406. If the current wheel speed 402 is above the slip corridor 404, the correction factor is set in such a way that the brake pressure rises above the pressure specified by the precontrol value since the wheel transmits too little braking force onto the subsurface. As a result of the increased brake pressure, more braking force is generated and the wheel speed 402 again falls into the slip corridor 406.

In one exemplary embodiment, a deviation of the derivative of the wheel speed 402 from a setpoint rotational speed change of the rotational speed curve associated with the current time value is converted into the correction factor. The correction factor is thereby controlled directly and the wheel speed 402 remains within the slip corridor 406.

In other words, an ABS initial control optimization to a high coefficient of friction is presented by way of braking force-gradient limitation (pre-control action—PCA).

In high initial braking gradients at a high coefficient of friction, that is, a quick increase in the braking input, it is advantageous to limit the braking force gradient at the wheel brake in order to ensure an optimal entry into the ABS control. Force buildup gradients that are too steep otherwise produce an excessively high wheel slip and a subsequent great first pressure reduction for stabilizing the wheel when entering the ABS. By limiting the braking force gradient, it is possible to achieve an optimal coefficient of friction utilization and a shortening of the braking distance.

The braking force gradient limitation PCA is started if a quick driver admission pressure increase is detected and a certain brake slip and a certain braking torque were reached on the wheel. The braking force gradient limitation is then implemented in that the intake valve is controlled and the further rise of the wheel brake pressure is controlled using a pressure build-up pulse sequence. The control of the setpoint gradient of the build-up pulse sequence is calculated as a function of the derivative of the wheel speed. The measure may be activated and parameterized by axle, that is, for the front axle and the rear axle. The function may also be activated in automatic emergency braking actions when the admission pressure is not generated via the driver, but via the ESP system or an I-booster.

For vehicles exhibiting a strong pitching behavior during initial braking, such as front-heavy vehicles having a high center of gravity and a soft suspension, the braking force-gradient limitation may also be used as a pitch damping measure in that the build-up gradient is kept markedly below the maximum braking force. For this purpose, a corresponding parameterization is required.

In the calculation of the setpoint build-up gradient presented here, the vehicle's own pitch dynamics or the dynamic normal force changes are taken into account. The build-up gradient is in this case not adjusted in a closed-loop control as a function of the wheel slip, since during the initial braking phase the normal forces on the front and rear axle may change very quickly. The control presented here via the derivative of the wheel speed exhibits a high dynamic performance. Furthermore, it is not expedient in very phase of the normal force change to adjust a specific slip. If the vehicle is already about to spring back, for example, and the normal forces on the front axle are falling again, the approach presented here avoids an excessively steep build-up gradient on this axle in order to ensure a smooth transition into the ABS. The concept presented here offers a high robustness and requires low application efforts for a short braking distance and for optimizing the ABS initial control behavior.

The approach presented here improves the ABS initial control behavior in that a precontrol adapts the base build-up form of the wheel pressure of each axle to the normal force change of the vehicle during the initial braking process. In addition, a closed-loop controller compensates for tolerances occurring with increased dynamics, such as for example an air play of the brake pads, tolerances in the brake coefficient and/or a roadway coefficient of friction.

An axle-specific time-variant precontrol gradient determines the basic form of the PCA pressure build-up gradient for adapting the wheel brake torques to the normal force build-up during the pitching process. This characteristic setpoint pressure curve may be optimized on the basis of a time control for the fast initial braking process. The wheel-specific correction mechanism (feedback controller) compensates for disturbances with high dynamics around the characteristic basic form. A wheel deceleration is adjusted as the setpoint value within a time-dependent slip band. The basic form of the build-up is adapted via the closed-loop controller as a function of the system deviation.

The wheel deceleration is chosen as the setpoint value for the closed-loop controller, which makes it possible to react quickly to the wheel behavior. Within definable slip bands, the setpoint value may be specified via the PCA active time. This makes it possible to build up braking force quickly at the beginning of the PCA control with high setpoint wheel decelerations, the transition into the ABS being controlled with less wheel deceleration as setpoint value shortly before reaching the normal force maximum. Additionally, a maximum and a minimum slip band is defined as a function of the PCA time. When exceeding the maximum slip or falling below the minimum slip, the control amplifications are increased in order to achieve an immediate pressure maintenance when slip is too high and a very steep build-up gradient when the pressure is too low.

FIG. 4 shows a wheel speed curve of a wheel during the PCA control including corresponding control ranges. The characteristic aspect here is the pressure gradient limitation with a continuous gradient change as a function of the wheel deceleration and a stepwise gradient adaptation when defined wheel slip limits are exceeded or undershot.

Finally, it is pointed out that terms such as "having," "comprising," etc. do not exclude other elements or steps and that term such as "one" or "a" do not exclude a plurality.

What is claimed is:

1. A method for operating a brake system of a vehicle, comprising:
    obtaining, by the brake system, input of a brake pressure request;
    determining an admission pressure gradient of admission pressure values of the brake pressure request;
    prior to a braking force on wheels of the vehicle exceeding a static friction of the wheels on a subsurface of the wheels and in response to the determined admission pressure gradient being greater than a predefined gradient, setting precontrol values such that a brake precontrol gradient of the precontrol values is lower than the determined admission pressure gradient, wherein the setting of the precontrol values is performed using as input (a) the admission pressure values and (b) a processing specification representing a braking dynamics of the vehicle; and
    controlling valves in a manner that changes brake pressures at the wheels according to the set precontrol values.

2. The method as recited in claim 1, wherein the precontrol value is set per axle of the vehicle.

3. The method as recited in claim 1, wherein the processing specification is a predefined vehicle-specific normal force curve model that models how a normal force against each of the wheels is expected to cyclically change over time during and due to a braking operation of the vehicle.

4. The method as recited in claim 1, wherein the processing specification is a predefined vehicle-specific pitching dynamics model that models how a pitch of the vehicle is expected to cyclically change over time during and due to a braking operation of the vehicle.

5. The method as recited in claim 1, wherein the controlling of the valves is further based on derivatives of wheel speeds of the wheels.

6. The method as recited in claim 5, wherein the controlling is performed over a period that includes an initial brake application time and a subsequent brake application time, and the controlling is performed in the initial brake time in accordance with the set precontrol values and in the subsequent brake application time in accordance with a combination of the set precontrol values and the derivatives of the wheel speeds.

7. The method as recited in claim 5, wherein the controlling is performed in such a way that the wheel speed is reduced within a slip corridor.

8. A brake system for a vehicle configured to:
    obtain input of a brake pressure request;
    determine an admission pressure gradient of admission pressure values of the brake pressure request;
    prior to a braking force on wheels of the vehicle exceeding a static friction of the wheels on a subsurface of the wheels and in response to the determined admission pressure gradient being greater than a predefined gradient, set precontrol values such that a brake precontrol gradient of the precontrol values is lower than the determined admission pressure gradient, wherein the setting of the precontrol values is performed using as input (a) the admission pressure values and (b) a processing specification representing a braking dynamics of the vehicle; and
    control valves in a manner that changes brake pressures at the wheels according to the set precontrol values.

9. A non-transitory machine-readable storage medium on which is stored a computer program for operating a brake system of a vehicle, the computer program, when executed by a computer, causing the computer to perform a method, the method comprising:
    obtaining input of a brake pressure request;
    determining an admission pressure gradient of admission pressure values of the brake pressure request;
    prior to a braking force on wheels of the vehicle exceeding a static friction of the wheels on a subsurface of the wheels and in response to the determined admission pressure gradient being greater than a predefined gradient, setting precontrol values such that a brake precontrol gradient of the precontrol values is lower than the determined admission pressure gradient, wherein the setting of the precontrol values is performed using as input (a) the admission pressure values and (b) a processing specification representing a braking dynamics of the vehicle; and
    controlling valves in a manner that changes brake pressures at the wheels according to the set precontrol values.

10. A method for operating a brake system of a vehicle, comprising:
    setting a precontrol value for a brake pressure of the brake system using (a) an admission pressure value representing an admission pressure in the brake system and (b) a processing specification representing; and
    controlling valves in a manner that changes brake pressures at the wheels according to the set precontrol values;
    wherein the processing specification is:
        (a) a predefined vehicle-specific normal force curve model that models how a normal force against each of the wheels is expected to cyclically change over time during and due to a braking operation of the vehicle; or (b) a predefined vehicle-specific pitching dynamics model that models how a pitch of the vehicle is expected to cyclically change over time during and due to a braking operation of the vehicle.

11. The method as recited in claim 10, wherein the processing specification is the predefined vehicle-specific normal force curve model.

12. The method as recited in claim 10, wherein the processing specification is the predefined vehicle-specific pitching dynamics model.

* * * * *